United States Patent

Shyu

[11] Patent Number: 5,166,833
[45] Date of Patent: Nov. 24, 1992

[54] REAR SIDE MIRROR FOR VEHICLES

[76] Inventor: Tian T. Shyu, P.O. Box 82-144, Taipei, Taiwan

[21] Appl. No.: 743,921

[22] Filed: Aug. 12, 1991

[51] Int. Cl.$^5$ .............................................. G02B 5/10
[52] U.S. Cl. ...................................... 359/864; 359/869
[58] Field of Search ...................... 359/864, 868, 869

[56] References Cited

U.S. PATENT DOCUMENTS

| 3,764,201 | 10/1973 | Haile | 359/864 |
| 4,264,144 | 4/1981 | McCord | 359/868 |
| 4,331,382 | 5/1982 | Graff | 359/868 |
| 4,620,777 | 11/1986 | Nu | 359/869 |

| 5,005,962 | 4/1991 | Edelman | 359/864 |

Primary Examiner—Bruce Y. Arnold
Assistant Examiner—J. P. Ryan
Attorney, Agent, or Firm—Alfred Lei

[57] ABSTRACT

This invention relates to a rear side mirror for vehicles and in particular to one including a front side with a flat surface and a rear side having a first planar surface gradually decreased in width from an inner edge to a vertical lateral edge, a second surface concaving from a vertical outer edge towards the first planar surface, and a third surface concaving from a lower edge towards the first planar surface.

1 Claim, 4 Drawing Sheets

REAR SIDE MIRROR FOR VEHICLES

BACKGROUND OF THE INVENTION

It is found that attempts have been made to improve the performance of rear side mirrors by providing auxiliary mirror structures that may either be independently mounted on the vehicle or attached to the conventional side mounted mirrors. The usual type of auxiliary mirror heretofore provided comprises a circular segment of a spherical surfaced shell that may be adhesively bonded onto a surface of the primary mirror if the primary mirror is sufficiently large as in the case of truck mirror. Alternatively, a spherical segment mirror may be mounted exteriorly on the vehicle in independent relationship to any of the other mirrors.

However, such mirrors are not satisfactory in use and it is therefore an object of the present invention to provide an improved rear side mirror which may obviate and mitigate the above-mentioned drawbacks.

SUMMARY OF THE INVENTION

This invention relates to an improved rear side mirror.

It is the primary object of the present invention to provide a rear side mirror which may widen the vision angle of the driver.

It is another object of the present invention to provide a rear side mirror which may prevent the driver from being irritated by the light beam from the rear.

It is still another object of the present invention to provide a rear side mirror which is simple in construction.

It is still another object of the present invention to provide a rear side mirror which is economic to produce.

It is still another object of the present invention to provide a rear side mirror which is fit for mass production.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 3:
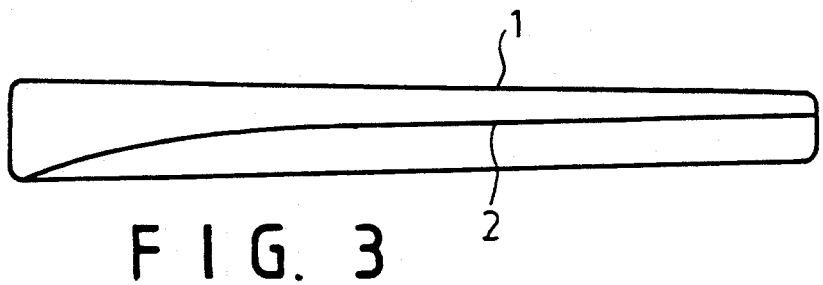
FIG. 3 is a top view of the rear side mirror.
Figure 2:
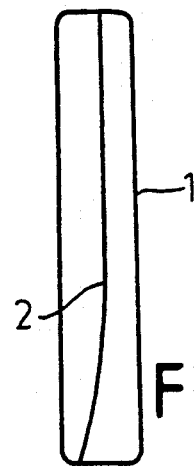
FIG. 2 is a side view of the rear side mirror.
Figure 1:
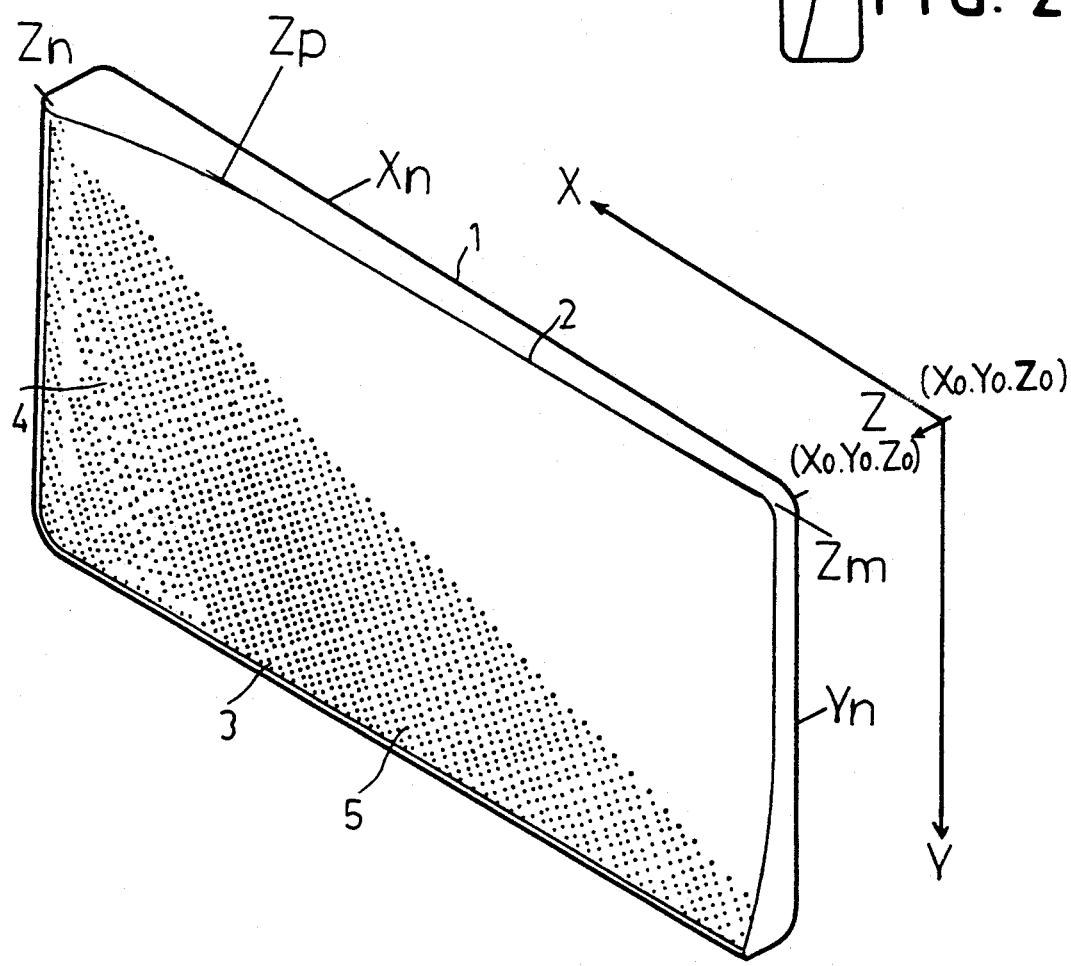
FIG. 1 is a perspective view of a rear side mirror according to the present invention.

With reference to the drawings and in particular to FIGS. 1, 2, and 3, the rear side mirror according to the present invention comprises a front side 1 with a flat surface and a reflective rear side 2 with a partially curved surface. The rear side 2 includes a first surface 3 which extends from a lateral inner edge 3A to a lateral top edge 3B, and a second surface 4 concaving from a vertical outer edge 4A towards a vertical inner edge 3C of the first surface, and a third surface 5 concaving from a lateral bottom edge 5A towards the lateral inner edge 3A.

As mentioned above, the present invention is composed of a first surface 3, a second surface 4 and a third surface 5. The first surface 3 is planar in structure and extends downwards from Yo to Yn, leftwards from Xo to Xn and outwards from Zm to Zp. The second surface 4 is arcuated in structure and concaves outwards from Zp to Zn. The third surface 5 is also arcuated in structure and concaves inwards from Zn to Zp and Zm.

Figure 4:
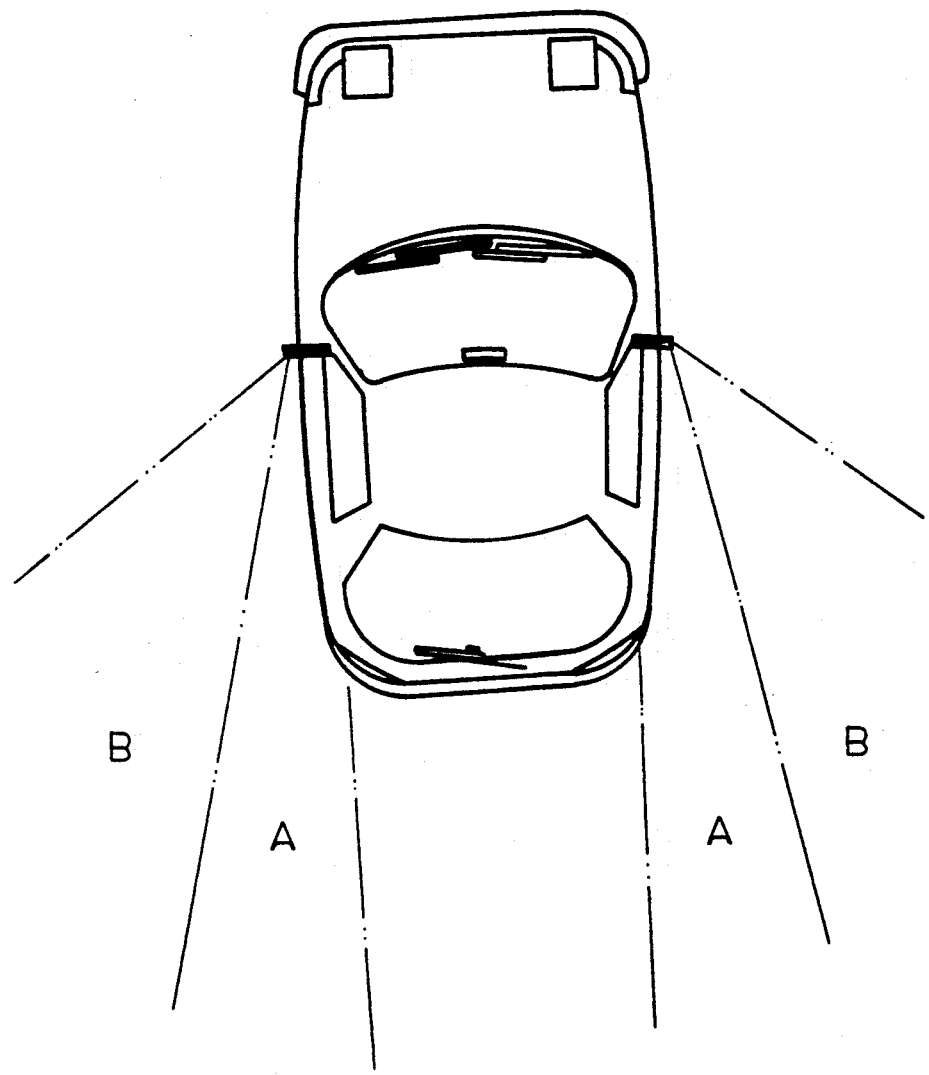
FIG. 4 is a working view of the rear side mirror.
Figure 6:
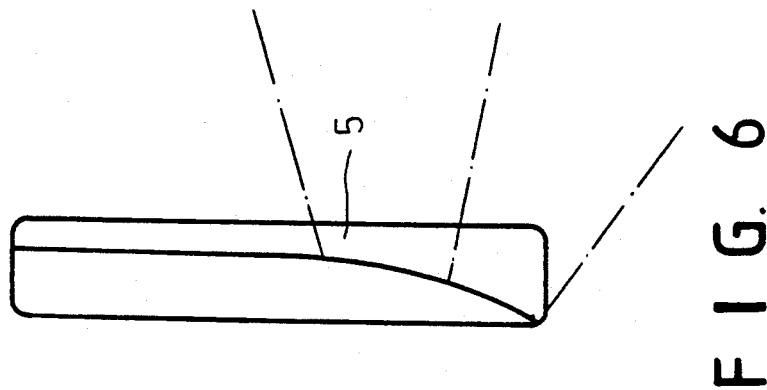
FIG. 6 is a side view of FIG. 5.
Figure 5:
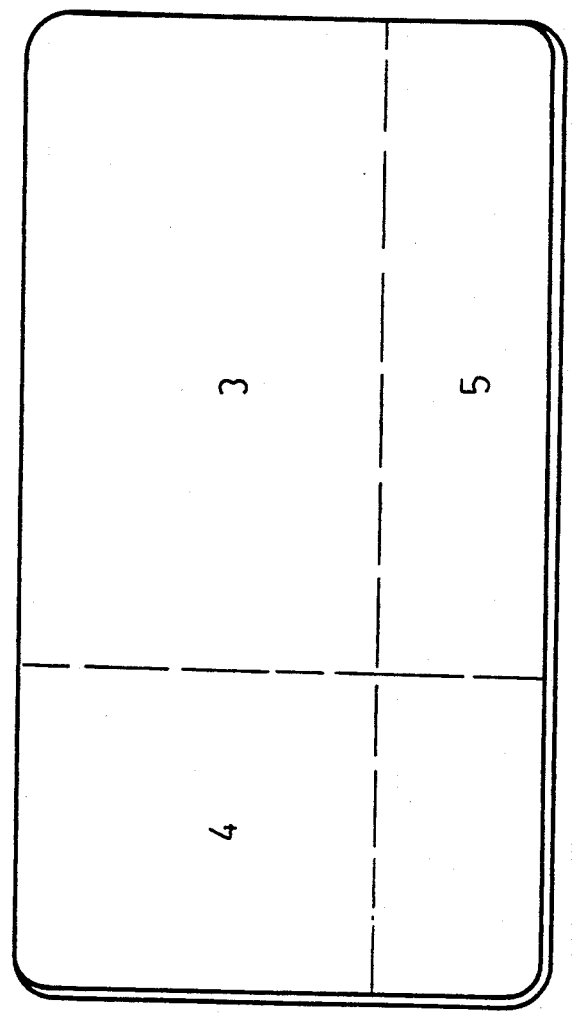
FIG. 5 shows another preferred embodiment of the rear side mirror.

Hence, the rear side mirror according to the present invention mainly comprises a first surface 3, a second surface 4 and a third surface 5. The first surface 3 is designed for the driver to observe the region A, while the second surface 4 is designed to observe the region B (see FIG. 4). As to the third surface 5, it is used to reflect downward to the condition of the road surface (see FIG. 6).

Figure 7:
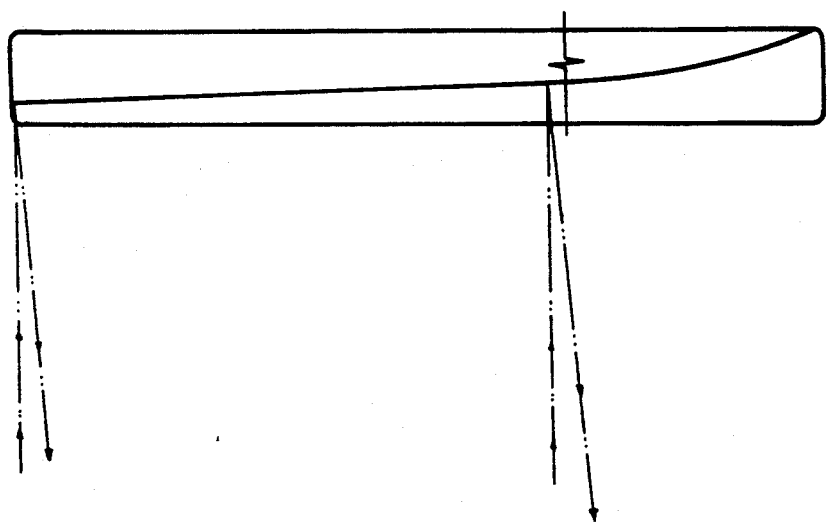
FIG. 7 shows a third preferred embodiment of the rear side mirror.

Further, the light beam from the rear will be reflected away from the eye of the driver (see FIG. 7) thereby preventing the driver from being irritated by the light and therefore, making the drive safer.

The application of the present invention is too wide to be mentioned and cannot be all enumerated here in detail. It is understood that the present disclosure is made by way of example only and that numerous changes in the detail of construction and the combination of parts may be resorted to without departing from the spirit and scope of the invention as hereinafter claimed.

I claim:

1. A rear side mirror comprising:
a front side with a flat surface; and
a reflective rear side including a first planar surface which extends from a lateral inner edge to a lateral top edge, a second surface concaving from a vertical outer edge towards a vertical inner edge of said first planar surface, and a third surface concaving from a lateral bottom edge towards said lateral inner edge.

* * * * *